INVENTOR
W. SHOCKLEY
BY
Arthur J. Torsiglieri
ATTORNEY

Sept. 16, 1958 W. SHOCKLEY 2,852,677

HIGH FREQUENCY NEGATIVE RESISTANCE DEVICE

Filed June 28, 1955 3 Sheets-Sheet 2

INVENTOR
W. SHOCKLEY
BY
Arthur J. Torsiglieri
ATTORNEY

Sept. 16, 1958 W. SHOCKLEY 2,852,677

HIGH FREQUENCY NEGATIVE RESISTANCE DEVICE

Filed June 28, 1955 3 Sheets-Sheet 3

INVENTOR
W. SHOCKLEY
BY
Arthur J. Torsiglieri
ATTORNEY 2,852,677
Patented Sept. 16, 1958

2,852,677

HIGH FREQUENCY NEGATIVE RESISTANCE DEVICE

William Shockley, Madison, N. J., assignor to Bell Telephone Laboratories, Incorporated, New York, N. Y., a corporation of New York Application June 28, 1955, Serial No. 518,489

5 Claims. (Cl. 250—36)

This invention relates to semiconductive devices and more particularly to such devices exhibiting negative power dissipation to alternating signals and to applications for devices having such negative power dissipation.

This application relates to improvements in a device of the kind described in my application Serial No. 333,449, filed January 27, 1953, now United States Patent 2,794,917. In that application there is described a device which includes a semiconductive element comprising a pair of terminal zones of like conductivity type spaced by an intermediate zone of opposite conductivity type, and it is shown that by proper correlation of the structural and operating parameters of the device negative resistance may be provided between a pair of electrode connections to the two terminal zones.

The term "negative resistance" is employed in the earlier and instant applications to characterize a device which provides negative power dissipation to an alternating signal. Negative power dissipation is realized when the integrated product of the signal voltage and signal current over a cycle of operation is negative. A negative integrated product of current and voltage may be achieved by establishing a phase shift between the voltage and current of between 90 and 270 degrees. As set forth in the earlier application, semiconductive devices including a semiconductive element wherein the transit time of charge carriers from the emitting terminal zone to the reverse biased barrier associated with the collecting terminal zone falls between one-half and three halves the period of the applied signal can be made to exhibit negative resistance to that signal. In the operation there described, a D.-C. potential difference is maintained between the pair of terminal zones of the semiconductive element to bias the emitting junction in the forward direction and the collecting junction in the reverse direction to establish the conditions necessary for negative resistance. The semiconductive element is designed so that the transit time of minority carriers across the intermediate zone which acts as a delay space is much shorter than the transit time across the space charge region associated with the collecting junction, whereas the voltage drop in the body occurs largely across such space charge region.

It has now been discovered that the operation of devices of the kind described may be improved if expedients are employed to increase selectively the forward bias across the emitting junction of the semiconductive element and so effectively to reduce the impedance of this emitting junction. In particular, such expedients increase the power which may be abstracted for utliization, an effect which may be characterized as lowering the negative "Q" of the device.

In accordance with the present invention, a semiconductive device of the kind described above is modified by the inclustion of means for increasing the forward bias on the emitting junction of the semiconductive element relative to the reverse bias on the collecting junction, whereby the impedance to alternating signals of the emitting junction is reduced. Various expedients are feasible consistent with the principles of the present invention for achieving this end.

As a first expedient to this end, there is increased the reverse current of thermally generated majority carriers drawn into the intermediate delay space from the collecting terminal zone. Typically, this may be realized by encouraging the thermal generation of hole-electron pairs in the collecting zone, as by utilizing for the collecting zone material of lower lifetime than that used in the remainder of the body and controlling the temperature of this material appropriately.

As a second expedient to the same end, carriers of the type predominant in the intermediate delay space are injected into the collecting terminal zone by way of a rectifying connection thereto for diffusion therefrom across the collecting junction into the delay space. Typically, such injection may be carried out by providing either a rectifying point electrode connection to the collecting terminal zone or a rectifying p–n junction connection thereto.

As still a third expedient, a nonrectifying electrode connection to which a voltage is applied is made to the intermediate delay space and an added D.-C. forward bias is thereby established across the emitting junction. While operation in this manner results in a circuit arrangement which superficially resembles common emitter operation of a conventional junction transistor, certain important distinctions may be noted which will be more fully developed hereinafter.

The principles of the present invention find particular application in "dissected" amplifiers of the kind described in my copending application Serial No. 364,291, filed June 26, 1953, now Patent No. 2,777,906, issued January 15, 1957, in which a negative resistance element is inserted in a wave transmission path which is otherwise made to have nonreciprocal transmission characteristics. The net effect is to provide amplification to waves propagating along the path in a selected direction of propagation.

The invention will be more fully understood from the following more detailed description taken in conjunction with the accompanying drawings in which.

Figure 2A:
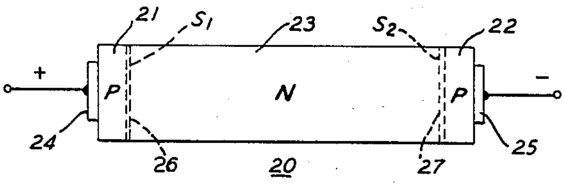
Fig. 2A illustrates an element of the kind shown in Fig. 1 which is operated in accordance with the invention to have a distribution of free carriers of the kind plotted in Fig. 2B while the distribution of chemical impurities is typically as shown in Fig. 2C.
Figure 2B:
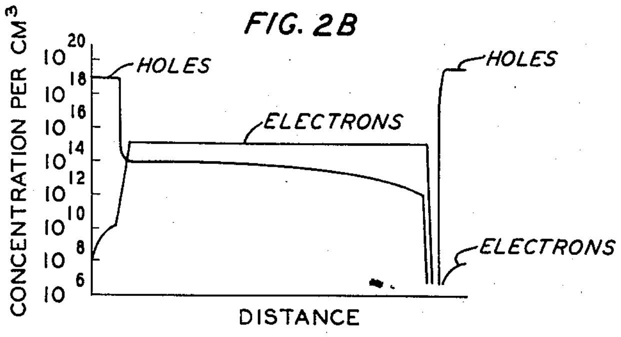
Figure 5:
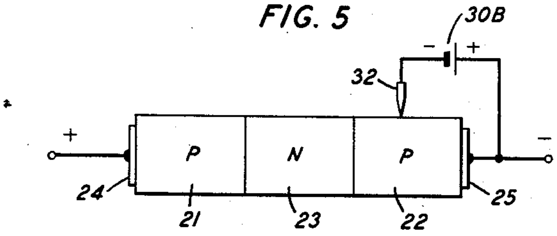
Figure 6:
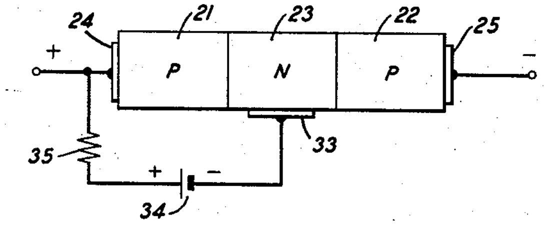
Figure 7:
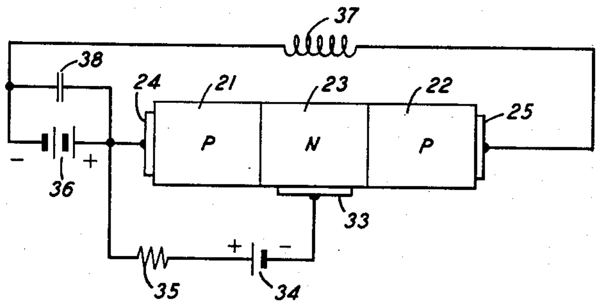
Figure 8:
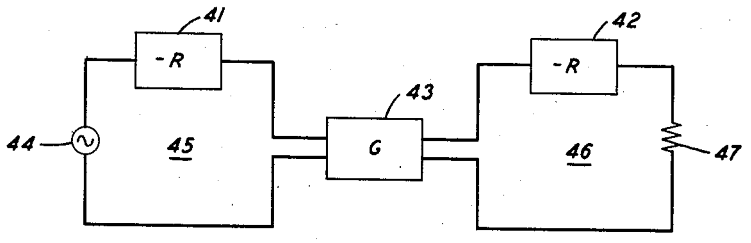
Figure 9:
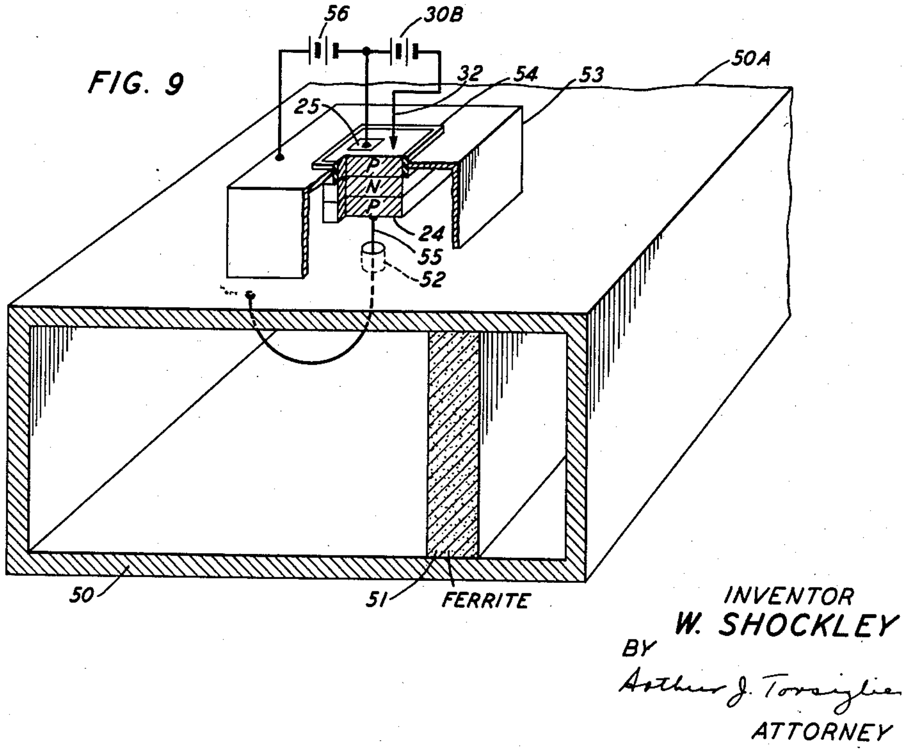

Each of Figs. 3 through 6 represents a different embodiment of the invention and includes an element of the kind shown in Fig. 2A in combination with means to make possible the operating characteristics shown in Fig. 2B; and Figs. 7 through 9 represent different applications of embodiments of the invention.

Figure 1:
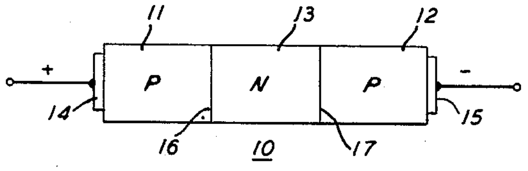
Fig. 1 shows a diode semiconductive element which may be employed to provide negative resistance as described in the parent application.

With reference now more particularly to the drawings, in Fig. 1 there is shown a semiconductive body 10, typically of germanium, which includes a pair of terminal zones 11, 12 of P-type conductivity and an intermediate zone 13 of N-type conductivity which serves as a delay space. Electrodes 14 and 15 make nonrectifying or ohmic connection to zones 11 and 12, respectively. The two electrodes are maintained at the relative potentials indicated by suitable voltage supply means, whereby the emitting junction 16 is biased in the forward direction and the collecting junction 17 in the reverse direction. As explained in the parent application, by suitable design of the semiconductive body, negative resistance to signals in a given band of frequencies may be provided across electrodes 14 and 15. In particular, for such an effect the transit time (as defined hereinafter) of the minority carriers, in this case holes, across the intermediate delay space 13 is adjusted to be approximately one-half the period of the alternating voltages in the operating band. Additionally, the body is designed so that both the transit time across the space charge region associated with the collecting junction is much shorter than the transit time across the delay space and the voltage drop in the body occurs principally across this space charge region. As used herein, the transit time of minority carriers across the delay space for the case of pure diffusion is given by the quantity $$\frac{W^2}{4\pi D}$$

where W is the thickness of the delay space and D is the diffusion constant of the minority carriers in such space. If the distribution of donors in the delay space is arranged to provide an electrostatic field which provides drift in addition to diffusion, the transit time will be affected correspondingly.

The theories of two separate modes of operation of a device of the kind described are developed in great detail in the application Serial No. 333,449. Briefly summarized, in the one mode of operation here of special interest, under the influence of the alternating voltage applied between the terminal zones, holes are injected from the terminal zone 11 past the emitting junction 16 into the intermediate zone 13. Such holes diffuse through the major portion of that zone at a relatively low speed, and then enter the space charge region surrounding the reverse biased collecting junction 17 where the major voltage drop occurs. The high field in the space charge region quickly carries the holes across this region into terminal zone 12. The utilization as a delay space of a relatively wide intermediate zone in a semiconductive body in which there is little field and where the motion of the charge carriers occurs relatively slowly located intermediate between the source of charge carriers and the region in which the major voltage drop occurs is characteristic of this mode of operation. In particular, the delay space is operated so that the transit time of the holes from the source of charge carriers to the collecting zone is so related to the frequency of the alternating voltage of the signal superimposed that there is introduced a phase shift of between 90 and 270 degrees in the alternating voltage and current. The resulting negative resistance can be employed for use in an oscillator by associating with the semiconductive element an impedance which is resonant with the reactance of the element at the frequency at which the negative resistance effect is sufficiently pronounced.

Reviewed again briefly, the theory of operation is as follows: Under the influence of voltages applied as shown, a hole current will flow from zone 11 to zone 12. When the potential on zone 12 increases, the potential of zone 13 increases proportionally, and, as a result, there will be an increase of hole current through the N-type region of zone 13. However, there will be a time lag between the increase of the voltage applied to zone 12 and the actual flow of holes from the N-type portion of zone 13 to P-type zone 12. As a consequence, the hole current flowing into zone 12 will have a phase lag relative to the voltage applied on zone 12. When this phase lag is made between 90 and 270 degrees, the impedance of the device looking in on the zone 12 terminal can be made to be characterized by negative resistance.

As previously indicated, it has now been found that the operation of negative resistance elements of the kind described may be improved if provision is made for increasing the forward bias on the emitting junction for reducing the impedance of this junction where such impedance is defined as the ratio of the alternating voltage drop across this junction to the alternating current flowing across the junction.

In Fig. 2A there is shown a semiconductive element 20 which resembles that shown in Fig. 1 but for which it is desired to provide operating characteristics of the kind plotted in Fig. 2B which has been found advantageous for achieving the desired low negative Q. As before, the element comprises a semiconductive body having terminal zones 21, 22 of P-type conductivity and an intermediate zone 23 of N-type conductivity which serves as the delay space. Electrodes 24, 25 make ohmic connections to terminal zones 21, 22, respectively. Associated with the emitting junction and the collecting junction of the body are the space charge layers $S_1$ and $S_2$ intermediate between the terminal zones and the intermediate zone.

This semiconductive body is designed with various considerations in mind. The emitting junction 26 is considerably more heavily doped on the side of terminal zone 21, typically by a factor of ten thousand so that the terminal zone 21 will function well as an emitter. Moreover, throughout the intermediate zone the concentration of holes is arranged to be less than the electron concentration, typically by a factor of fifty so that the motion of holes is predominantly by diffusion in the delay space. The transit time of the holes across the space charge region $S_2$ associated with the collecting junction 27 is made small compared to their total transit time between emitter and collector but the voltage drop across such space charge region is the major portion of the voltage drop across the body.

Figure 2C:
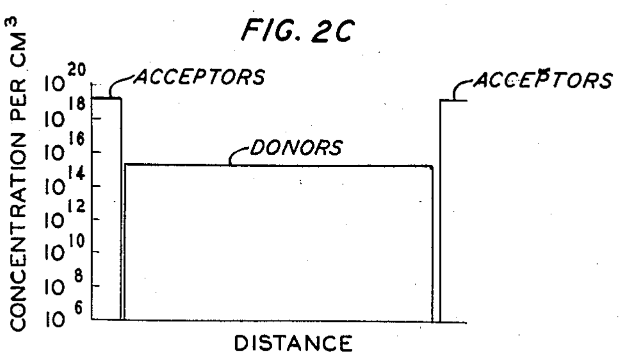

It will be convenient to describe the invention with specific reference to an embodiment which has been constructed and tested successfully. The particular embodiment described is, of course, intended to be merely illustrative. There are depicted in Figs. 2B and 2C the characteristics of the semi-conductive element used in the embodiment being specifically described. This body comprises as shown in Fig. 2A a monocrystalline germanium wafer of approximately $10^{-2}$ centimeter$^2$ cross section and five mils length and includes an intermediate zone 23 of approximately four mils width and of resistivity approximately .75 ohm-centimeter. The terminal zones 21, 22 were formed by the fusion process known to the workers in the art in which indium buttons were fused to opposite ends of the wafer for forming low resistivity P-type terminal zones. The widths of these terminal zones 21, 22 are not material but are estimated to be approximately one-half a mil. In the various other figures, the terminal zones are shown as of considerably larger relative thicknesses.

In Fig. 2B there is plotted the distribution of free electrons and holes found experimentally to be advantageous in different regions of the body for operation in accordance with the invention. In Fig. 2C there is plotted the distribution of chemical charge impurities across the body.

It is noted that as depicted, the product of the concentration of free holes and electrons at the emitting junction is approximately $10^{29}$ per centimeter$^3$. A product of this general order of magnitude is found advantageous for keeping the impedance of the emitting junction relatively low. However, at equilibrium the product of the concentration of free holes and electrons in germanium at room temperature is $10^{27}$ per centimeter$^3$. Accordingly, in order to achieve the desired higher product at the emitting junction, it is necessary to provide a continuous supply of electrons and holes to this region to raise the product of their concentration to the desired value. This is tantamount to applying a forward bias on the emitting junction sufficient to maintain this degree of unbalance from the equilibrium condition. It is necessary to increase both electron and hole concentrations if approximate space charge neutrality is to be maintained. Since the necessary supply of holes can be provided by injection from the emitter zone, it is necessary only to provide a supply of electrons to the intermediate zone. Various expedients are provided in accordance with the invention to this end.

Figure 3:
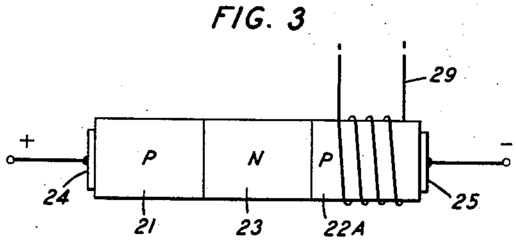

In accordance with the first expedient to be described, the terminal zone 22A, as shown in Fig. 3, is made of material which is characterized by a low lifetime for minority carriers. Such low lifetime is the equivalent of a high rate both for the recombination of charge carriers present and for the thermal generation of new charge carriers. A low lifetime and high rate of thermal generation of charge carriers may be achieved in this zone, for example, by the diffusion therein of a trace of copper or nickel. However, it is important to keep the lifetime of the material in the delay space high to keep the negative Q of the device low. To accelerate the thermal generation of hole-electron pairs in terminal zone 22, in the arrangement depicted a heating element 29 is shown schematically positioned adjacent the terminal zone 22 for heating this zone. However, ordinarily it should be possible to adjust the lifetime of the material forming the terminal zone to provide such thermal generation of carriers at room temperature and so to make a heating element unnecessary. As a result of the large reverse bias across the collecting junction, many of the electrons which are thermally generated in the terminal zone 22 will be drawn into the intermediate zone 23. These electrons will, in turn, effect a flow of holes from terminal zone 21 into the intermediate zone and, as a consequence, the increase in concentration of holes and electrons there provides the desired increment in the forward bias across the emitting junction.

Figure 4:
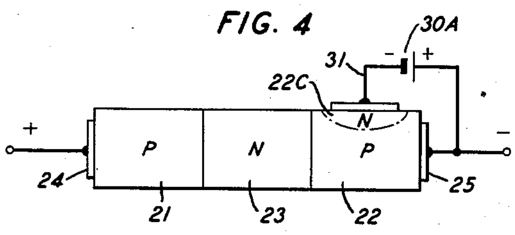

In Fig. 4 there is shown a negative resistance element in accordance with the invention which employs an alternative expedient to increase the electron flow into the intermediate zone to achieve the desired extra forward bias on the emitting junction. To this end the basic structure shown in Fig. 2 is modified to provide means for the injection of electrons into the terminal zone 22 for diffusion across the collecting junction into the intermediate zone 23. To this end, a portion of terminal zone 22 is converted to N-type conductivity to form an N-type zone 22C, and the junction therebetween is biased in a forward direction by means of a voltage supplied by voltage source 30A and applied to electrodes 25 and 31.

Alternatively, electrons may be injected into terminal zone 22 in the manner shown in Fig. 5 in which a point electrode 32 makes a rectifying connection to the terminal zone 22 of the semiconductive element. Electrode 32 is maintained at a negative potential with respect to the terminal zone 22 by voltage source 30B for the injection of electrons into terminal zone 22.

In each of the embodiments shown in Figs. 4 and 5, electrons injected into terminal zone 22 are drawn under the influence of the reverse bias on the collecting junction into the intermediate zone 23 where they provide the needed electron current for increasing the forward bias on the emitting junction.

In the arrangement shown in Fig. 6, the basic arrangement shown in Fig. 2 is modified to include an electrode 33 which makes a nonrectifying connection to the intermediate zone 23 and a voltage source 34 is connected between electrodes 24 and 33 to increase the forward bias on the emitting junction as desired. In this arrangement, the function intended for the electrode 33 is the control of the D.-C. forward bias on the emitting junction. It is undersirable that any signal current be shunted into this D.-C. biasing circuit. In this respect the operation of a device of this kind is fundamentally different from transistor operation in which the flow of signal currents in the base circuit is indispensable to useful operation. To minimize any signal shunting effect the circuit associated with electrode 33 may have, it is desirable to increase the impedance of this circuit, and to this end the resistor 35 is inserted in this circuit to insure that the impedance offered to signal currents by this circuit is appreciably higher than that offered by the circuit through the emitting junction. In particular, the impedance of this circuit should be at least ten times the emitter impedance. In this vital respect also can the principles of the device described be distinguished from usual transistor principles, since in transistor operation it is desirable to minimize the base resistance.

It seems desirable at this point, before describing specific applications of the invention, to differentiate more specifically devices exhibiting negative resistance in accordance with the invention from devices of the prior art which they superficially resemble.

First, in devices in accordance with the invention, the semiconductive body is designed so that the transit time of minority carriers through the intermediate zone which serves as the delay space is a large fraction, advantageously one-half, of the period of the operating alternating signal. In contradistinction, in prior art devices bearing a resemblance to those of the invention, operation is generally such that the transit time of minority carriers across the intermediate zone which serves as the base is a small fraction of the signal period. Stated somewhat differently, in prior art devices there is defined a parameter $f_\alpha$, designated the alpha cutoff frequency, which is related to the transit time of minority carriers across the base, and operation is generally at frequencies below the alpha cutoff frequency. In contradistinction in the practice of the present invention, operation is at a frequency necessarily at least ten, and advantageously about twenty, times the alpha cutoff frequency.

Additionally, in the usual junction transistor which is used for the amplification of input signals, it is customary to operate such that a real positive value close to unity is had by the parameter $\alpha$ which is defined as equal to the ratio $$\left.\frac{i_e}{i_c}\right|_{E_c \text{ constant}}$$

where $i_e$ and $i_c$ represent the signal currents flowing across the emitting and collecting junctions, respectively, and $E_c$ is the D.-C. collector bias. However, this parameter becomes a complex number as the frequency is increased, and the operation contemplated is such that the imaginary part of this complex parameter has positive value as distinguished from a zero or negative value characteristic of conventional operation. In addition, the absolute value of this complex number in the operation contemplated is a small fraction of unity because many of the holes which cross the emitting junction in one portion of the operating cycle flow back across it in a succeeding portion of the cycle.

Moreover, whereas junction transistors require three electrode connections to the semiconductive element, each of which is effectively part of the circuit for alternating voltages, in the practice of the invention only two electrodes actively serve as part of the circuit for alternating currents, even though in some embodiments three connections may be provided to the semiconductive element. As a corollary, whereas in the usual junction transistor it is important to minimize the lateral base resistance, in the practice of the present invention the resistance of the path provided by any electrode connection to the delay space should be high. Accordingly, when a semiconductive device in accordance with the invention is employed in an amplifier, the input signal source and the output load are both effectively connected to the same pair of electrodes of the semiconductive element. Similarly, when a semi-conductive device in accordance with the invention is employed in an oscillator, it is unnecessary to provide any external feedback between branch paths of the external circuitry of the device, but rather internal feedback of the kind which gives rise to the negative resistance effect is sufficient.

As illustrative of an application of the devices in accordance with the invention, in Fig. 7 there is shown an oscillator which, by way of example, incorporates as the negative resistance element the semiconductive device shown in Fig. 6. In the interest of simplicity the same reference numerals have been used in the two figures to designate like elements. To the basic configuration previously shown, an inductor 37 is connected in series with the biasing voltage source 36 between electrodes 24 and 25 of the semiconductive element. Alternatively, the voltage source may be connected in shunt across the resonant circuit formed by the inductor and the semi-conductive element. The frequency of oscillation essentially is the frequency at which the inductance of element 37 resonates with the capacitance of the semiconductive element. The size of voltage source 36 and the design of the semiconductive element are correlated so that the transit time of the holes from terminal zone 21 to terminal zone 22 has the correct relation to the period of the resonant frequency as described hereinbefore for negative resistance. The capacitor 38 is inserted to provide a bypass for the oscillatory signal around the voltage source 37. Typically, its capacitance will be large compared to that of the semiconductive element so that it will little affect the frequency of oscillation. To provide the added forward bias on the emitting junction characteristic of the present invention, the voltage source 34 and the current limiting resistor 35 are serially connected between electrodes 33 and 24 in the manner shown in Fig. 6.

In an oscillator which has been constructed incorporating the semiconductive element whose characteristics are depicted in Figs. 2A through 2C the source 34 provided approximately 0.8 volt, the element 35 had a resistance of about 4000 ohms, the element 37 had an inductance of about 40 microhenries, the source 36 provided approximately 12 volts, and the element 38 a capacitance of about 4 microfarads. The D.-C. current flowing in the signal path was about 0.7 milliampere and the D.-C. current into the intermediate zone about 0.2 milliampere. For such circuit parameters, the oscillations had a frequency of approximately 3.6 megacycles, corresponding to a capacitance for the semiconductive element of approximately 60 micromicrofarads. In an oscillator of this kind, oscillatory wave energy may be abstracted either by shunting the load across the inductor 37 or inserting it serially in the circuit path between electrodes 24 and 25.

In Fig. 8, there is illustrated how a negative resistance element of the kind provided by the invention may be incorporated into a dissected amplifier. In this application, a pair of negative resistance devices 41, 42 shown schematically but which may be any one of the kind shown in Figs. 3 through 6 are cascaded with a nonreciprocal element 43, which typically may be a Hall-effect plate or gyrator of the kind described in application Serial No. 219,342, filed April 15, 1951, now Patent No. 2,649,574, issued August 18, 1953. Such a nonreciprocal element is adapted to provided low attenuation to signal transmission from the branch 45, including signal source 44 and the semiconductive element 41 to the branch 46, including the load 47 and semiconductive element 42, and substantially larger attenuation to transmission from branch 46 to branch 45. Amplifier arrangements of this kind are described in greater detail in application Serial No. 302,278, filed August 1, 1952, now Patent No. 2,775,658, issued December 25, 1956.

In Fig. 9 there is shown a high frequency application of the use of a negative resistance device in accordance with the invention in a dissected amplifier of the kind described in copending application Serial No. 364,291, filed June 26, 1953. The hollow rectangular wave guide 50 is made to have nonreciprocal transmission properties by the insertion therein of a ferrite element 51 which is magnetized by means not shown in a direction parallel to the electric vector of the dominant mode of the wave guide 50. The general principles of nonreciprocal arrangements of this kind are described in copending application Serial No. 362,193, filed June 17, 1953. By choice in the direction of the magnetic field applied to the ferrite element, the wave guide may be made to offer much higher attenuation to wave energy propagating therethrough in the undesired direction.

Amplification sufficient to overcome the attenuation in the low loss direction but insufficient to overcome the attenuation in the high loss direction may be provided by inserting a negative resistance device of the kind described along the wave path. In wave guide applications of this kind, it is advantageous to avoid having to provide electrode connections to the intermediate zone so that devices of the kind shown in Figs. 3, 4 and 5 are preferable. By way of example, there is employed in the arrangement shown in Fig. 9 a negative resistance device of the kind shown in Fig. 5. In the interest of simplicity, similar reference numbers are used to denote like elements.

Coupled to the main guide 50 through an aperture 52 in a broad wall 50A of the main guide 50 is an auxiliary nonresonant chamber 53, of dimensions small relative to the operating wavelengths wherein is positioned the semiconductive body. The semiconductive body is positioned so that its collecting zone forms for radio frequency currents a portion of the upper wall of the auxiliary chamber 53. The semiconductive body is insulated for D.-C. currents from the chamber 53 by the insertion of a thin dielectric spacer 54 between the body and the chamber wall. A coupling loop 55 is used to apply the radio frequency energy in the main guide to the body. For this purpose, the coupling loop 55 has one end fastened to the broad wall 50A of the main guide and the other end connected to the emitter electrode 24 of the semiconductive body in the chamber 53. The intermediate portion of the loop is positioned to couple inductively to the magnetic vector of the radio frequency energy in the wave guide and passes through the aperture 52 in the wave guide wall 50A. To provide a D.-C. bias necessary to negative resistance operation, the positive terminal of the voltage source 56 is connected to the emitter electrode 14 by way of the coupling loop 52 and its negative terminal is connected to the collector electrode 15. The voltage source 30B has its negative terminal connected to the rectifying point electrode connection 32 to the collecting zone and its positive terminal to electrode 25 making ohmic connection to the collecting zone.

From the various applications which have been illustrated, it can be appreciated that negative resistance devices in accordance with the invention have a wide variety of uses. It is also to be understood that the specific embodiments described are merely illustrative of the general principles of the invention. For example, while the invention has been described with reference to P N P bodies, it is feasible to employ N P N bodies so long as the polarities of the voltage sources are suitably reversed. Moreover, the semiconductive body may be formed of any suitable semiconductor material such as silicon or any of the group III-group V compounds known to exhibit semiconductive properties.

Moreover, various modifications may be devised without departing from the spirit and scope of the present invention. In particular, as described in copending application Serial No. 516,691, filed June 20, 1955, there may be utilized to advantage for high frequency operation P N I P and N P I N semiconductive bodies. Moreover, the semiconductive bodies may be designed to have in the intermediate zone which serves as the delay space a gradient in the charge impurity concentration which provides a built-in electrostatic field which superimposes a drift velocity on the diffusion velocity of carriers through the delay space to the end that a body having an intermediate zone of given dimensions may be used for operation at a higher frequency.

What is claimed is:

1. An arrangement for providing across a pair of output terminals a negative resistance over an operating range of frequencies comprising a semiconductive body having an intermediate zone of one conductivity type between a spaced pair of emitting and collecting terminal zones of opposite conductivity type for forming spaced emitting and collecting junctions in the body, a pair of electrodes making nonrectifying connections to the two terminal zones, means including a voltage source for applying a voltage across the two electrodes for biasing the emitting junction in the forward direction and the collecting junction in the reverse direction for establishing a flow of minority charge carriers through the intermediate zone, the dimensions of the body being such that the period of a cycle in the operating range is approximately twice the transit time of the minority charge carriers through the intermediate zone and the distribution of chemical impurities in the body being such that the major portion of the voltage drop in the body occurs across the space charge region associated with the collecting junction, and means for providing an added forward bias on the emitting junction in addition to that provided by the first-mentioned voltage source.

2. An arrangement in accordance with that of claim 1, further characterized in that the pair of electrodes making nonrectifying connections to the terminal zones are connected to the pair of output terminals and a utilization circuit is connected between the two output terminals.

3. An arrangement in accordance with claim 2 further characterized in that the utilization circuit comprises a signal source and a load.

4. An oscillator comprising an arrangement for providing across a pair of output terminals a negative resistance in accordance with claim 1 in further combination with inductive means connected in shunt across said pair of output terminals, the inductance of said inductive means being resonant with the reactive component of the semiconductor body at a frequency whose period is approximately twice the transit time of the minority carriers through the intermediate zone of the semiconductive body.

5. In an oscillator, a semiconductive element comprising a semiconductive body including emitting and collecting terminal zones of one conductivity type and an intermediate zone therebetween of opposite conductivity type, and a pair of electrodes making ohmic connection to the two terminal zones, means including a voltage source connected between the two electrodes for biasing the emitting junction in the forward direction and the collecting junction in the reverse direction for establishing a flow of minority carriers through the intermediate zone, inductive means connected between the two electrodes which resonates with the reactive component of the semiconductive element at a frequency whose period is approximately twice the transit time of the minority charge carriers across the intermediate zone, an electrode making ohmic connection to the intermediate zone, and means including a voltage source connected between the electrode associated with the emitting zone and the electrode associated with the intermediate zone for increasing the forward bias on the emitting junction beyond that provided by the voltage source connected between the two electrodes associated with the two terminal zones.

References Cited in the file of this patent

UNITED STATES PATENTS

| | | |
|---|---|---|
| 2,569,347 | Shockley | Sept. 25, 1951 |
| 2,600,500 | Haynes et al. | June 17, 1952 |
| 2,655,608 | Valdes | Oct. 13, 1953 |
| 2,655,610 | Ebers | Oct. 13, 1953 |
| 2,672,528 | Shockley | Mar. 16, 1954 |
| 2,681,993 | Shockley | June 22, 1954 |
| 2,701,309 | Barney | Feb. 1, 1955 |